United States Patent [19]

Sogliani et al.

[11] Patent Number: 5,085,354
[45] Date of Patent: Feb. 4, 1992

[54] DISPENSER DEVICE FOR LIQUID SUBSTANCES

[75] Inventors: Claudio Sogliani, Cerese di Virgilio; Carlo Corniani, Marmirolo, both of Italy

[73] Assignee: Azionaria Costruzioni Macchine Automatiche A.C.M.A. S.p.A., Bologna, Italy

[21] Appl. No.: 545,748

[22] Filed: Jun. 29, 1990

[30] Foreign Application Priority Data

Jul. 6, 1989 [IT] Italy .................. 3544 A/89

[51] Int. Cl.$^5$ .................. B67C 3/00
[52] U.S. Cl. .................. 222/504; 222/564; 141/147
[58] Field of Search .......... 222/380, 514, 540, 567, 222/564; 141/147

[56] References Cited

U.S. PATENT DOCUMENTS

| 2,144,628 | 1/1939 | Hothersall | 141/147 |
| 2,905,363 | 9/1959 | Newey et al. | 222/510 |
| 3,072,302 | 1/1963 | Giovannoni et al. | 222/504 |
| 3,307,751 | 3/1967 | Kraft | 222/564 |
| 3,830,264 | 8/1974 | Billet et al. | 141/147 |
| 4,741,448 | 5/1988 | Alley et al. | 222/564 |
| 4,844,344 | 7/1989 | Manhardt et al. | 222/547 |
| 4,917,308 | 4/1990 | Manhardt et al. | 222/564 |

FOREIGN PATENT DOCUMENTS

| 814431 | 6/1959 | United Kingdom . |
| 1350209 | 4/1974 | United Kingdom . |
| 1515212 | 6/1978 | United Kingdom . |

Primary Examiner—Donald T. Hajec
Assistant Examiner—Shari M. Wunsch
Attorney, Agent, or Firm—Guido Modiano; Albert Josif

[57] ABSTRACT

The dispenser device for liquid substances has a chamber for accommodating a liquid substance, at least one first passage arranged in an upper portion of the chamber and adapted to allow the inflow of the liquid substance into the chamber, and a dispenser suitable for feeding the liquid substance into the chamber through the first passage. A second passage is provided for the outflow of the liquid substance from a lower portion of the chamber, a valve adjusts the flow of the liquid substance through the second passage, and a flow deflector element is arranged within the chamber and is interposed in a fixed position between the first passage and the second passage. The deflector element has a substantially torroidal shape, and an intermediate portion thereof flanks, at a substantially constant distance, the inner surface of the chamber.

3 Claims, 1 Drawing Sheet

DISPENSER DEVICE FOR LIQUID SUBSTANCES

BACKGROUND OF THE INVENTION

The present invention relates to a dispenser device for liquid substances.

More in particular, the present invention relates to a device for feeding liquid substances into containers in a filling machine.

As known, in machines for filling containers with liquid substances it is necessary to limit as much as possible the formation of foam in the liquids being fed, and it is furthermore important to eliminate, before the liquid is fed into the containers, any foam which might be already present.

In order to achieve these results, devices have been produced which are suitable for eliminating foam from liquids by treating said liquids with high-frequency radiant energy, in particular devices are known for generating ultrasonic waves, microwaves or infrared radiation.

Though they are considerably efficient, devices of this type are however particularly complicated and expensive.

Devices have also been provided wherein the liquid which must be deprived of foam is made to flow on a plurality of successive rotating disks in the form of a laminar layer.

However, these devices are excessively complicated and too expensive.

SUMMARY OF THE INVENTION

The aim of the present invention is to provide a dispenser device for liquid substances which is particularly simple.

Within this aim, an object of the invention is to provide a dispenser device which is advantageous from an economical standpoint.

Another object of the invention is to provide a device which can dispense liquid substances without producing foam and which can eliminate any foam which might already be present in said liquid substances before they pass through said dispenser device.

The above-mentioned aim and objects, as well as other objects of the invention which will become apparent hereinafter, are achieved by a dispenser device for liquid substances which is characterized in that it comprises a chamber for receiving a liquid substance, at least one first passage arranged in an upper portion of said chamber and being adapted to allow an inflow of said liquid substance into said chamber, delivery means for feeding said liquid substance into said chamber through said first passage, a second passage for the outflow of the liquid substance from a lower portion of said chamber, valve means for adjusting the flow of said liquid substance through said second passage, and a flow deflector element arranged within said chamber and being interposed in a fixed position between said first passage and said second passage, said deflector element having an intermediate portion which flanks the inner surface of said chamber at a substantially constant distance, a gap for the passage of said liquid substance being defined between said intermediate portion and said inner surface, said gap having a thickness which is equal to said distance.

BRIEF DESCRIPTION OF THE DRAWINGS

The present invention is now described with reference to the accompanying drawings, which show a non-limitative example of an illustrative embodiment thereof, wherein.

DESCRIPTION OF THE PREFERRED EMBODIMENTS

Figure 1:
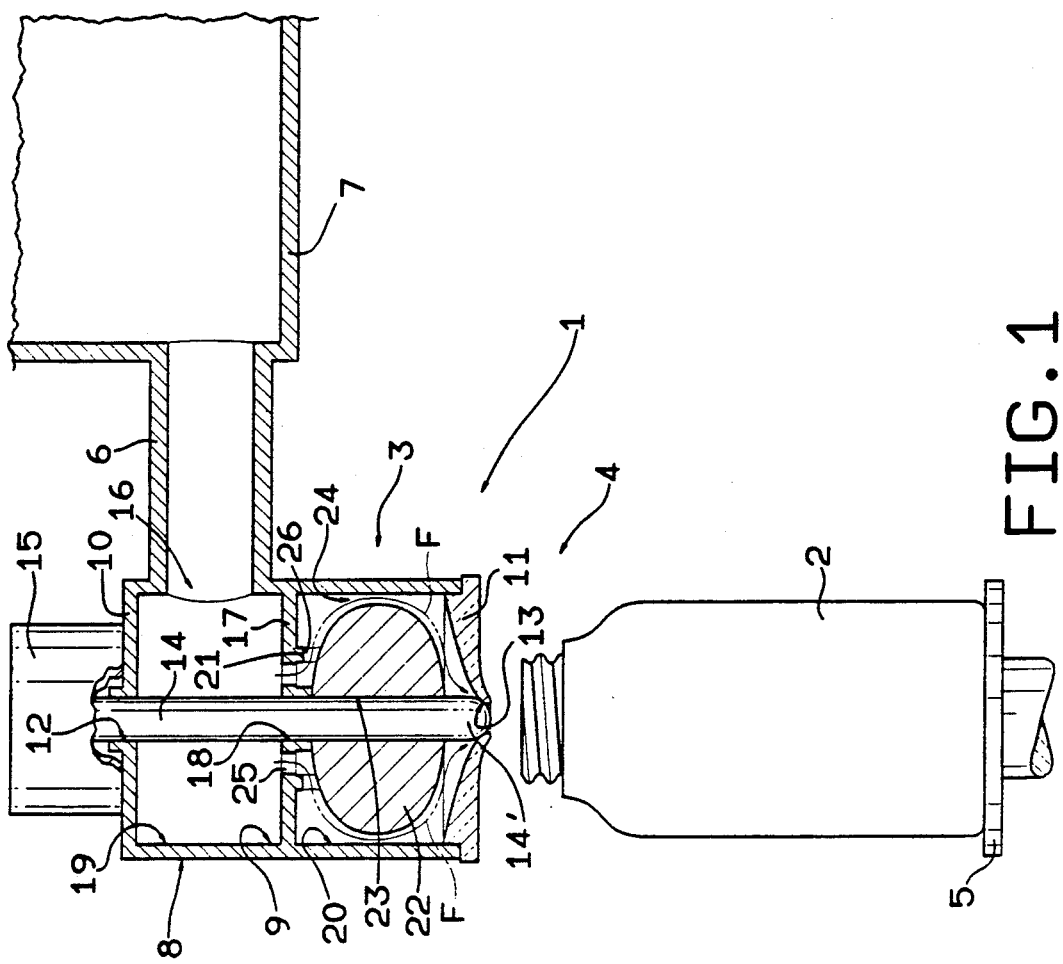
FIG. 1 is a partially sectional schematic elevation view of a dispenser device for liquid substances manufactured according to one aspect of the present invention inserted, in a first type of context, in a container-filling machine.

With reference to FIG. 1, the reference numeral 1 generally indicates a filling machine which is illustrated only partially and is adapted for filling containers 2 with liquid substances.

Said machine 1 comprises a dispenser device 3 supported, in a manner which is not illustrated, by a portion of said machine 1, for example a rotary filling conveyor with vertical axis, (not illustrated), above a station 4 for filling the containers 2.

The containers 2 are conveyed in succession to the filling station 4 by conveyor means which can be of any conventional type and which comprise, in the illustrated example, a supporting plate 5 which is a part of said known rotary filling conveyor which is not illustrated.

The dispenser device 3 leads, in a known manner, by means of a duct 6, to a delivery means constituted by a tank 7 adapted for dispensing a liquid and, according to what is illustrated in FIG. 1, comprises a substantially cylindrical container 8 with a vertical axis which internally defines a cylindrical chamber 9 and is closed above and below by respective disk-like walls 10 and 11 which have formed therein respective central holes 12 and 13.

A shaft 14 coaxially traverses the chamber 9, and has an upper end which extends toward the outside of said chamber 9 through the hole 12 of the wall 10. The shaft 14 also has a lower end 14', which constitutes a valve element, sealingly inserted into a valve seat defined by the hole 13 of the wall 11.

The upper end of the shaft 14 is connected to an actuation means which is advantageously constituted by an electromagnet 15, the function whereof will be explained hereinafter, which is fixed to the upper face of the wall 10.

The duct 6 is connected to an upper lateral portion of the chamber 9 at an opening or passage 16 of the container 8 below which a fixed disk-like wall 17 is accommodated within the chamber 9; said wall is coaxial to the shaft 14, is adapted for slidably accommodating a portion of said shaft 14 within a central hole 18 and divides the chamber 9 into two chambers, respectively an upper one and a lower one, indicated by the reference numerals 19 and 20. The chamber 20 thus defines the upper disc-like wall 17, the lower disc-like wall 11, and a cylindrical side wall arranged between the upper and lower disc-like walls.

The wall 17 supports, by means of its own lower surface, a sleeve 21 which is coaxial to the shaft 14; the lower edge of said sleeve is rigidly associated with a flow deflector element 22 which is constituted by a body of revolution which has a substantially torroidal or doughnut shape. The element 22 is coaxially traversed by a hole 23 within which a portion of the shaft 14 is slidably accommodated and is arranged adjacent to the inner surface of the chamber 20 with an intermediate portion. Said intermediate portion defines a maximum horizontal circumference of the toroidal flow deflector element which flanks the inner surface of the chamber 20 at a substantially constant distance, and between the intermediate portion and the inner surface there is a gap 24 for the passage of the processed liquid; said gap has a thickness equal to said distance.

A passage is provided on a portion of the wall 17 which is radially internal with respect to the sleeve 21 and is proximate to the shaft 14; said passage is constituted by a plurality of vertical holes 25, only two of which are illustated in FIG. 1, which connect the upper chamber 19 to the inner cavity of said sleeve 21. In turn, the sleeve 21 is laterally provided with a passage which comprises a plurality of holes 26 (only two of which are illustrated in FIG. 1) which connect the internal cavity of the sleeve 21 to the lower chamber 20.

In use, the liquid contained in the tank 7 flows into the chamber 19 through the duct 6 and keeps said chamber 19 constantly full. The chamber 20 is equally full of liquid and receives said liquid through the holes 25 of the wall 17 and the holes 26 of the sleeve 21.

The electromagnet 15 can be actuated, in a manner which is known and not illustrated, by means (not illustrated) for controlling the transit and the successful filling of the containers 2, which, when an empty container 2 reaches the filling station 4, lift the shaft 14 by virtue of the electromagnet 15 and consequently open the hole 13 for a time sufficient to fill said container 2.

Before reaching the hole 13, the liquid which reaches the chamber 20 through the holes 25 strikes the flow deflector 22 at its upper curved surface and then follows the curvature of the doughnut-shaped flow deflector element past the gap 24 with a substantially laminar motion along a path which is schematically indicated by arrows F.

It has been observed that said motion of a substantially laminar layer of liquid in contact with the deflector 22 not only avoids the formation of foam during passage of the liquid in the lower chamber 20 but also eliminates any foam possibly present in the liquid contained in the upper chamber 19.

It has furthermore been observed that all the liquid present in the chamber 20 around said laminar layer remains substantially motionless, and is not involved in the elimination or formation of foam. Therefore, according to a different embodiment (not illustrated) of the present invention, said liquid could be replaced with a fixed body of revolution having substantially equal volume and bulk, coaxial to the shaft 14 and capable of filling the lower portion of the chamber 20, leaving only a small space for the passage of the liquid between the flow deflector 22 and said body of revolution.

Figure 2:
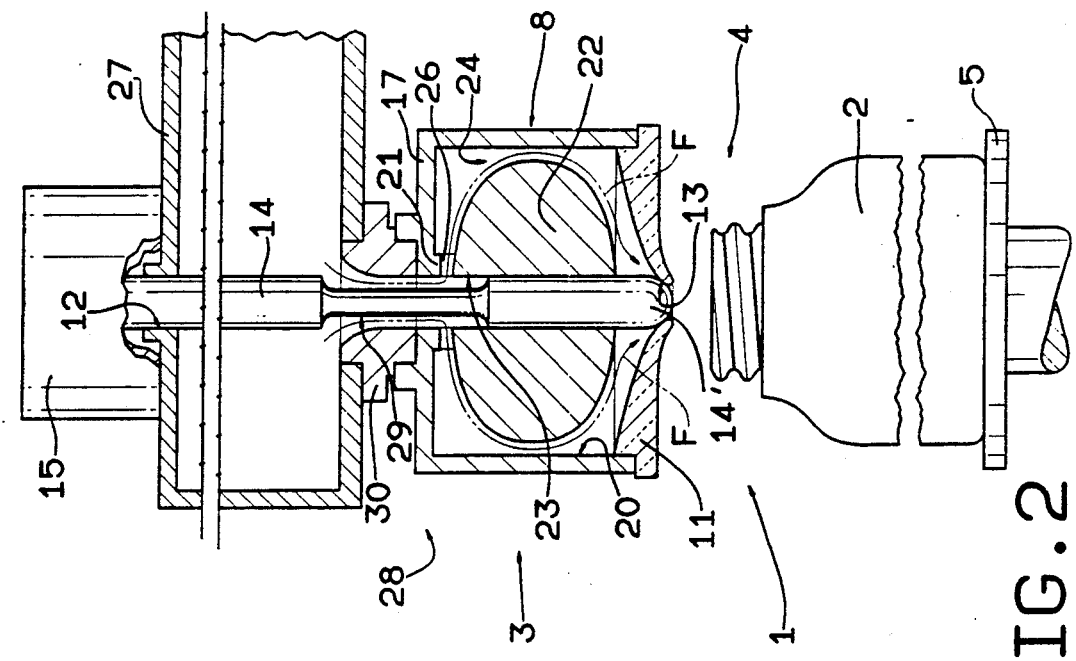
FIG. 2 is a partially sectional schematic elevation view of the dispenser device of FIG. 1 inserted, in a second type of context, in a container-filling machine.

According to what is illustrated in FIG. 2, the dispenser device 3 is not provided with the chamber 19 and is directly connected to a lower portion of a tank 27, which belongs to the upper portion of the rotary filling conveyor which is only partially illustrated and is indicated by 28.

The wall 17, which delimits above the only chamber 20 provided, does not have said holes 25, and the passage defined by the holes 25 in FIG. 1 is provided by a taper 29 of the shaft 14 in the region in which said shaft 14 passes through the wall 17.

A dispenser device 3 is connected to a nozzle 30 which, together with other identical nozzles 30 which are not illustrated and are uniformly circumferentially distributed (in a manner which is not illustrated) on the filling conveyor 28, is supported in a downward position by the tank 27, which is coaxial and rigidly associated with said filling conveyor 28; each of said nozzles is connected to a dispenser device 3.

Each shaft 14 traverses the entire tank 27, and the related electromagnet 15 is rigidly associated with the upper wall of said tank 27.

The operation of the dispenser devices 3 used in the filling machine 1 of FIG. 2 does not differ from that of the dispenser device 3 described with reference to FIG. 1.

However, it is important to notice that in many known filling machines which do not have devices for eliminating foam from the liquid being processed, said nozzles 30 are the elements which directly pour the liquid into the containers 2. Therefore the illustration of FIG. 2 clearly shows that dispenser devices 3 manufactured according to the teachings of the present invention can be easily and effectively inserted in existing filling machines manufactured with conventional criteria.

Without altering the concept of the invention, the variations which could be applied to the described dispenser device without abandoning the scope of the present invention are naturally numerous.

For example, the chamber 20 may have a cross section which differs from the cylindrical one, and the flow deflector element 22 might have a shape which differs from the one described. It is in fact sufficient for the flow deflector element to have transverse cross section which increases from its upper end toward an intermediate portion and preferably a transverse cross section which decreases from said intermediate portion to its lower end, and for said intermediate portion of said deflector element to flank, with a substantially constant distance, the inner surface of a chamber, leaving a uniform gap for the passage of the liquid.

From what has been described it is evident that the described dispenser device 3 for liquid substances is particularly simple and economical, and that it can dispense liquid substances without generating foam and depriving said liquids of any existing foam.

We claim:

1. Dispenser device for liquid substances comprising a chamber for receiving a liquid substance, said chamber being of substantially cylindrical shape with an upper disc-like wall, a lower disc-like wall, and a cylindrical side wall arranged between said upper and lower disc-like wall, said cylindrical side wall of said chamber defining an inner surface, said lower disc-like wall being provided with a lower central hole which defines a valve seat, said upper disc-like wall being provided with an upper central hole which is coaxial with said lower central hole, said dispenser device further comprising a reciprocating shaft slidably accommodated through said upper central hole and arranged inside said chamber, said shaft defining a vertical axis and a lower valve element end which is engageable into and out of said valve seat, said upper disc-like wall further being provided with passage hole means for receiving a liquid substance into said chamber, said passage hole means being arranged substantially circumferentially around and proximate to said shaft, said dispenser device further comprising a flow deflector element which is rigidly fixed inside said chamber, said flow deflector element being provided with a through hole which extends along said vertical axis of said shaft and in which said shaft is slidably accommodated, said flow deflector element being a toroidal doughnut-shaped body defining an upper curved surface arranged facing said passage hole means of said upper disc-like wall and a maximum horizontal circumference which closely flanks said inner surface of said cylindrical side wall of said chamber, a circular gap being defined between said maximum horizontal circumference of said flow deflector element and said inner surface of said cylindrical side wall of said chamber, said circurlar gap having a substantially uniform narrow width, whereby upon disengagement of said lower valve element end of said shaft from said valve seat, said liquid flows through said passage hole means and follows a substantially laminar flow path around said flow deflector element from said upper curved surface through said circular gap and finally through said lower central hole in said lower disc-like wall of said chamber.

2. Dispenser device according to claim 1, wherein said passage hole means are constituted by a plurality of vertical holes arranged circumferentially around said shaft, said plurality of vertical holes being in communication between said chamber and an upper cylindrical chamber connected to a liquid delivery tank by means of a duct, said flow deflector element being rigidly fixed inside said chamber by means of cylindrical sleeve which is coaxial to said shaft and which is interconnected between said flow deflector element and said upper disk-like wall, said sleeve being provided with a plurality of radial holes for fluid flow therethrough.

3. Dispenser device according to claim 1, wherein said shaft defines a tapered portion which is accommodated through said upper central hole and thereby said passage hole means are constituted by a passage defined between said tapered portion and said central hole, said passage being in communication between said chamber and a lower portion of a liquid containing tank which is part of an upper portion of a rotary conveyor, said flow deflector element being rigidly fixed inside said chamber by means of cylindrical sleeve which is coaxial to said shaft and which is interconnected between said flow deflector element and said upper disk-like wall, said sleeve being provided with a plurality of radial holes for fluid flow therethrough.

* * * * *